(12) United States Patent
Meredith et al.

(10) Patent No.: US 6,650,651 B1
(45) Date of Patent: Nov. 18, 2003

(54) SYSTEM AND METHOD TO IMPLEMENT A PACKET SWITCH OUTPUT BUFFER

(75) Inventors: Jim Meredith, Westford, MA (US); Paul Gallo, Newton, MA (US); Nanying Yin, Lincoln, MA (US); Heather Achilles, Hudson, NH (US); Mike Fortuna, Fremont, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/460,273

(22) Filed: Dec. 13, 1999

(51) Int. Cl.⁷ .................................................. H04J 3/02
(52) U.S. Cl. ........................ 370/412; 370/413; 370/419
(58) Field of Search ................................ 370/412–418, 370/419, 462; 710/52

(56) References Cited

U.S. PATENT DOCUMENTS

| | | |
|---|---|---|
| 4,500,987 A * | 2/1985 | Hasegawa .................. 370/462 |
| 5,402,416 A | 3/1995 | Cieslak et al. |
| 5,406,556 A | 4/1995 | Widjaja et al. |
| 5,440,553 A | 8/1995 | Widjaja et al. |
| 5,612,952 A | 3/1997 | Motoyama |
| 5,872,787 A | 2/1999 | Cooperman et al. |
| 6,032,205 A * | 2/2000 | Ogimoto et al. ............. 370/419 |
| 6,192,422 B1 * | 2/2001 | Daines et al. .................. 710/52 |

* cited by examiner

Primary Examiner—Salvatore Cangialosi
(74) Attorney, Agent, or Firm—Blakely Sokoloff Taylor & Zafman LLP

(57) ABSTRACT

The present invention provides a system and method to implement a packet switch buffer. Incoming data packets are temporarily stored in an input buffer memory. Data packets in the input buffer memory are then examined to determine locations in an output buffer memory where the data packets should be transferred. Data packets in the input buffer memory are then transferred to the output buffer memory, such that data packets destined for a line card are written in an output memory block corresponding to the line card. Afterward, data packets in the output buffer memory are extracted and forwarded to designated output destinations.

22 Claims, 4 Drawing Sheets

SYSTEM AND METHOD TO IMPLEMENT A PACKET SWITCH OUTPUT BUFFER

FIELD OF THE INVENTION

The present invention generally relates to packet switches, and particular to a system and method to implement a packet switch output buffer.

BACKGROUND

Packet switches are typically implemented within the various layers of a standard Open System Interconnection (OSI) Model which general networks use in order to allow data communication within a network environment. The typical packet switches contained in the standard OSI Model network are designed to provide the three lower layer services to the respective subscribers (i.e., physical layer, data link layer and network layer).

Accordingly, data packets or data cells are routed through the various layers of the OSI Model network by the respective packet switches of the standard network system. As data packet traffic within a network system increases, the need for a high data packet transfer rate becomes increasingly important to the proper overall operations of the network. It is therefore desirable to provide a packet switch that can provide a high data packet transfer rate.

SUMMARY OF THE INVENTION

The present invention provides a system and method to implement a packet switch output buffer. Incoming data packets are temporarily stored in an input buffer memory. Data packets in the input buffer memory are then examined to determine locations in an output buffer memory where the data packets should be transferred. Data packets in the input buffer memory are then transferred to the output buffer memory, such that data packets destined for a line card are written in an output memory block corresponding to the line card. Afterward, data packets in the output buffer memory are extracted and forwarded.

In accordance with one embodiment of the present invention, an output buffer in a packet switch includes an output buffer memory that is configured to store data packets. The output buffer memory includes number of output memory blocks. Each of the output memory blocks configured to store data packets destined for a corresponding line card. The output buffer further includes a scheduler coupled to the output memory to extract data packets stored in the output buffer memory.

The above described and many other features of the present invention will become apparent as the invention becomes better understood by reference to the following detailed description when considered in conjunction with the accompanying drawings.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Figure 1:
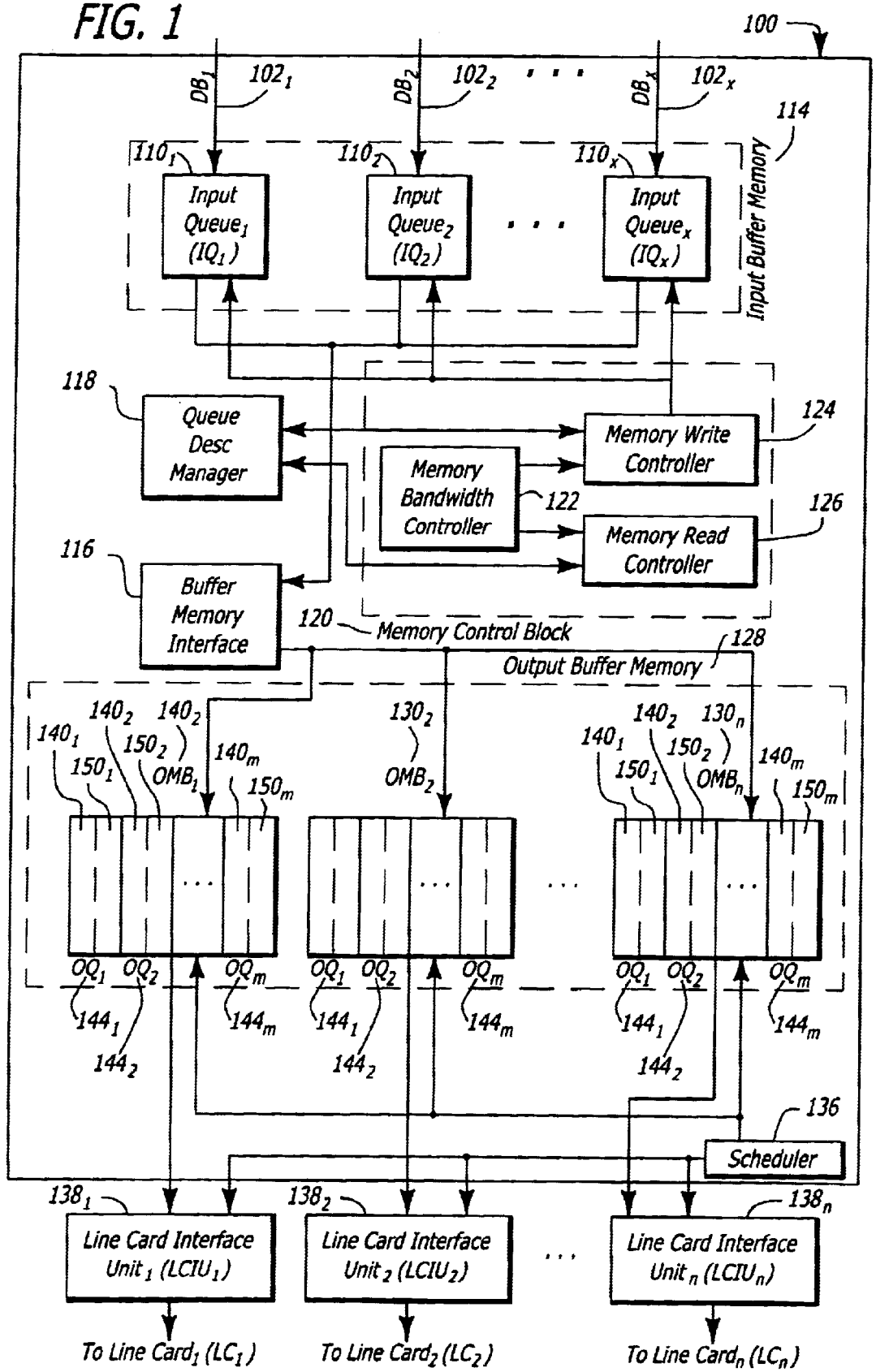
FIG. 1 illustrates an embodiment of a packet switch in accordance with the teachings of the present invention.

FIG. 1 is a block diagram of one embodiment of a packet switch system in accordance with the present invention. The packet switch system 100 includes "x" data buses ($DB_1$, $DB_2$, ... $DB_x$) $102_1$–$102^x$, where "x" is a positive whole number. These data buses ($DB_1$, $DB_2$, ..., $DB_x$) $102_1$–$102_x$ are operatively coupled input queues ($IQ_1$, $IQ_2$, ... $IQ_x$) $110_1$–$110_x$, which are located in input buffer memory 114. In one embodiment, input queues ($IQ_1$, $IQ_2$, ..., $IQ_x$) $110_1$–$110_x$ are implemented as First-In-First-Out queues. Data buses ($DB_1$, $DB_2$, ..., $DB^x$) $102_1$–$102_x$ supply data to input queues ($IQ_1$, $IQ_2$, ..., $IQ_x$) $110_1$–$110_x$ in the form of data packets or cells. Each data bus $102_1$–$102_x$ supplies data to a designated corresponding input queue $110_1$–$110_x$. For example, $DB_1$ $102_1$ supplies data to $IQ_1$ $110_1$; $DB_2$ $102_2$ supplies data to $IQ_2$ $110_2$; and $DB_x$ $102_x$ supplies data to $IQ_1$ $110_x$.

Buffer memory interface 116 is coupled to input queues ($IQ_1$, $IQ_2$, ..., $IQ_x$) $110_1$–$110_x$ to control the writing of input data into the input queues ($IQ_1$, $IQ_2$, ..., $IQ_x$) $110_1$–$110_x$, such that data available from data buses ($DB_1$, $DB_2$, ..., $DB_x$) $102_1$–$102_x$ at one instance in time can generally be written simultaneously into the input queues ($IQ_1$, $IQ_2$, ..., $IQ_x$) $110_1$–$110_x$ in one write cycle.

Buffer memory interface 116 is also coupled to output buffer memory 128 to facilitate transfers of data from input queues ($IQ_1$, $IQ_2$, ..., $IQ_x$) $110_1$–$110_x$ to "n" output memory blocks ($OMB_1$, $OMB_2$, ..., $OMB_n$) $130_1$–$130_n$, where "n" is a positive whole number. Output memory blocks ($OMB_1$, $OMB_2$, ..., OMB,) $130_1$–$130_n$ are located in output buffer memory 128. Input queues ($IQ_1$, $IQ_2$, ..., $IQ_x$) $110_1$–$110_x$ generally serve as a temporary storage space where a sufficient amount of input data can be gathered prior to being transferred to output memory blocks ($OMB_1$, $OMB_2$, ..., $OMB_n$) $130_1$–$130_n$ in output buffer memory 128. In one embodiment, input data is written into output memory blocks ($OMB_1$, $OMB_2$, ..., $OMB_n$) $130_1$–$130_n$ in 176-bit words. In this embodiment, incoming data is accumulated in input queues ($IQ_1$, $IQ_2$, ... $IQ_x$) $110_1$–$110_x$ until 176 bits of data are available to be transferred to output memory blocks ($OMB_1$, $OMB_2$, ..., $OMB_n$) $130_1$–$130_n$.

As stated above, data buses ($DB_1$, $DB_2$, ..., $DB_x$) $102_1$–$102_x$ supply data to input queues ($IQ_1$, $IQ_2$, ..., $IQ_x$) $110_1$–$110_x$ in the form of data packets. Each data packet contains an output destination parameter and a priority parameter. In one embodiment, the output destination and priority parameters may be incorporated into a header portion of each data packet. As will be described below in more details, the output destination and priority parameters dictate where the data packet will be placed in output buffer memory 128. Accordingly, buffer memory interface 116 examines the output destination and priority parameters contained in each data packet to determine where in output buffer memory 128 to place the data packet.

Output buffer memory 128 includes a plurality of output memory blocks ($OMB_1$, $OMB_2$, ..., $OMB_n$) $130_1$–$130_n$. In one embodiment, each output memory block ($OMB_1$, $OMB_2$, ..., $OMB_n$) $130_1$–$130_n$ is configured to store data packets destined for a designated line card ($LC_1$, $LC_2$, ..., $LC_n$) (not shown). For example, $OMB_1 130_1$ stores data packets destined for $LC_1$; $OMB_2 130_2$ stores data packets destined for $LC_2$; and $OMB_n 130_n$ stores data packets destined for $LC_n$. Each line card (LC) is a plug-in electronic Printed Circuit (PC) card that operates lamps, ringing, holding, and other features associated with one or several telephone lines or telephones in a telephone system.

Scheduler 136 is coupled to output memory blocks ($OMB_1$, $OMB_2$, ..., $OMB_n$) $130_1$–$130_n$ to facilitate the unloading or extracting of data packets from output memory blocks ($OMB_1$, $OMB_2$, ..., $OMB_n$) $130_1$–130, for transfer into line card interface units ($LCIU_1$, $LCIU_2$, ..., $LCIU_N$) $138_1$–$138_n$. At the command of scheduler 136, data packets from an output memory block $130_1$–$130_n$ are unloaded or extracted. The extracted data packets are eventually forwarded to line card interface units ($LCIU_1$, $LCIU_2$, ..., $LCIU_N$) $138_1$–$138_n$. Each LCIU $138_1$–$138_n$ generally converts the data packets to a format which a line card (LC) can accept, and forwards the converted data packets to the line cards. In one embodiment, each LCIU $138_1$–$138_n$ serializes the data packets so that the data packets can be forwarded to a corresponding line card (LC) through a series of serial ports or connections on the line card (LC). As illustrated, $LCIU_1$ $138_1$ forwards or supplies data to $LC_1$; $LCIU_2$ $138_2$ supplies data to $LC_2$; and $LCIU_N$ $138_n$ forwards data to $LC_n$.

Each output memory block $130_1$–$130_n$ is further divided into several output queues, using the following characteristics: output time slice and output destination. In the embodiment of FIG. 1, each output memory block $130_1$–$130_n$ is divided into "m" output queues ($OQ_1$, $OQ_2$, ..., $OQ_m$) $144_1$–144m, where "m" is a positive whole number. In this embodiment, a time division multiplexing (TDM) scheme is used to unload data packets from the output queues into the line card interface units. In the TDM scheme, each output queue ($OQ_1$, $OQ_2$, ..., $OQ_m$) $144_1$–$144_m$ is assigned a time slice ($TS_1$, $TS_2$, ..., $TS_m$) when data packets from the output queue is extracted or unloaded. Accordingly, data packets stored in $OQ_1$ $144_1$ are extracted or unloaded during $TS_1$; data packets stored in $OQ_2 144_2$ are extracted or unloaded during $TS_2$; and data packets stored in $OQ_m$ $144_m$ n are unloaded during $TS_m$.

As stated above in one embodiment, each line card interface unit ($LCIU_1$, $LCIU_2$, ..., $LCIU_N$) $138_1$–$138_n$ serializes the data packets so that the data packets can be forwarded to a corresponding line card (LC) via a plurality of serial ports or connections on the line card. In this embodiment, data packets destined for each port or connection on the line card are unloaded during a pre-assigned time slice. Accordingly, data packets destined for the first port or Port 1 on $LC_1$ are stored in $OQ_1$ $144_1$ of $OMB_1$ $130_1$ and are unloaded or extracted at $TS_1$.

Output queues ($OQ_1$, $OQ_2$, ..., $OQ_m$) $144_1$–$144_m$ in output memory blocks ($OMB_1$, $OMB_2$, ..., $OMB_n$) $130_1$–$130_n$ are further divided into queue sections $140_1$ –$140_m$ and $150_1$–$150_m$ according to data packet priority, including high-priority (HP) and low-priority (LP). Accordingly, high-priority data packets, which are to be unloaded during $TS_1$ and which are destined for $LC_1$, should be placed into the ($LC_1$, $TS_1$, HP) queue section $140_1$ of $OQ_1$ $144_1$ in $OMB_1$ $130_1$. Similarly, low-priority data packets, which are to be unloaded at $TS_m$ and which are destined for $LC_n$, should be placed into ($LC_n$, $TS_m$, LP) queue section $150_1$ of $OQ_m$ $144_m$ in $OMB_n$ $130_n$.

Scheduler extracts or unloads data packets from output memory blocks ($OMB_1$, $OMB_2$, ..., $OMB_n$) $130_1$–$130_n$ in accordance with a predetermined service sequence. It should be noted that the unloading of data packets from an output memory block is also referred to as servicing the output memory block. In one embodiment, scheduler employs a cyclical or round-robin service sequence to service output memory blocks ($OMB_1$, $OMB_2$, ..., $OMB_n$) $130_1$–$130_n$. In the round-robin service sequence, scheduler services output memory blocks ($OMB_1$, $OMB_2$, ..., $OMB_n$) $130_1$–$130_n$ during sequential block service periods 1 to n, wherein block service period 1 precedes block service period 2 and block service period n–1 precedes block service period n. Accordingly, scheduler 136 services $OMB_1 130_1$ during block service period 1, $OMB_2$ $130_2$ during block service period 2, and $OMB_n$ $130_n$ during block service period n.

During each block service period when a selected output memory block is serviced, scheduler 136 services the output queues ($OQ_1$, $OQ_2$, ..., $OQ_m$) $144_1$–$144_m$ in the selected output memory block using a cyclical or round-robin service sequence. In using a cyclical or round-robin service sequence, scheduler 136 services output queues ($OQ_1$, $OQ_2$, ..., $OQ_m$) $144_1$–$144_m$ in sequential queue service periods 1 to m, wherein queue service period 1 precedes queue service period 2 and queue service period m–1 precedes queue service period m. Accordingly, scheduler 136 services $OQ_1$ $144_1$ of an output memory block $130_1$–$130_n$ during queue service period 1, $OQ_2$ $144_2$ of an output memory block $130_1$–$130_n$ during queue service period 2, and $OQ_m$ $144_m$ of an output memory block $130_1$–$130_n$ during block service period m.

When servicing an output queue ($OQ_1$, $OQ_2$, ..., $OQ_m$) $144_1$–$144_m$ in an output memory block ($OMB_1$, $OMB_2$, ..., $OMB_n$) $130_1$–$130_n$ during a queue service period, scheduler 136 unloads or extracts a predetermined amount of data packets ($DP_{max}$) from the output queue. In extracting or unloading data packets from the output queue being serviced, scheduler first extracts data packets from the high-priority (HP) queue section $140_1$ of the output queue. Scheduler 136 then extracts data packets from the low-priority (LP) section $150_1$ of the output queue $144_1$–$144_m$ being serviced, so that a total of $DP_{max}$ data packets are extracted or unloaded from the output queue. Accordingly, data extracted during a queue service period may come from both the high-priority (HP) queue section $140_1$ and low-priority (LP) queue section $150_1$ of the output queue being serviced.

Figure 2:
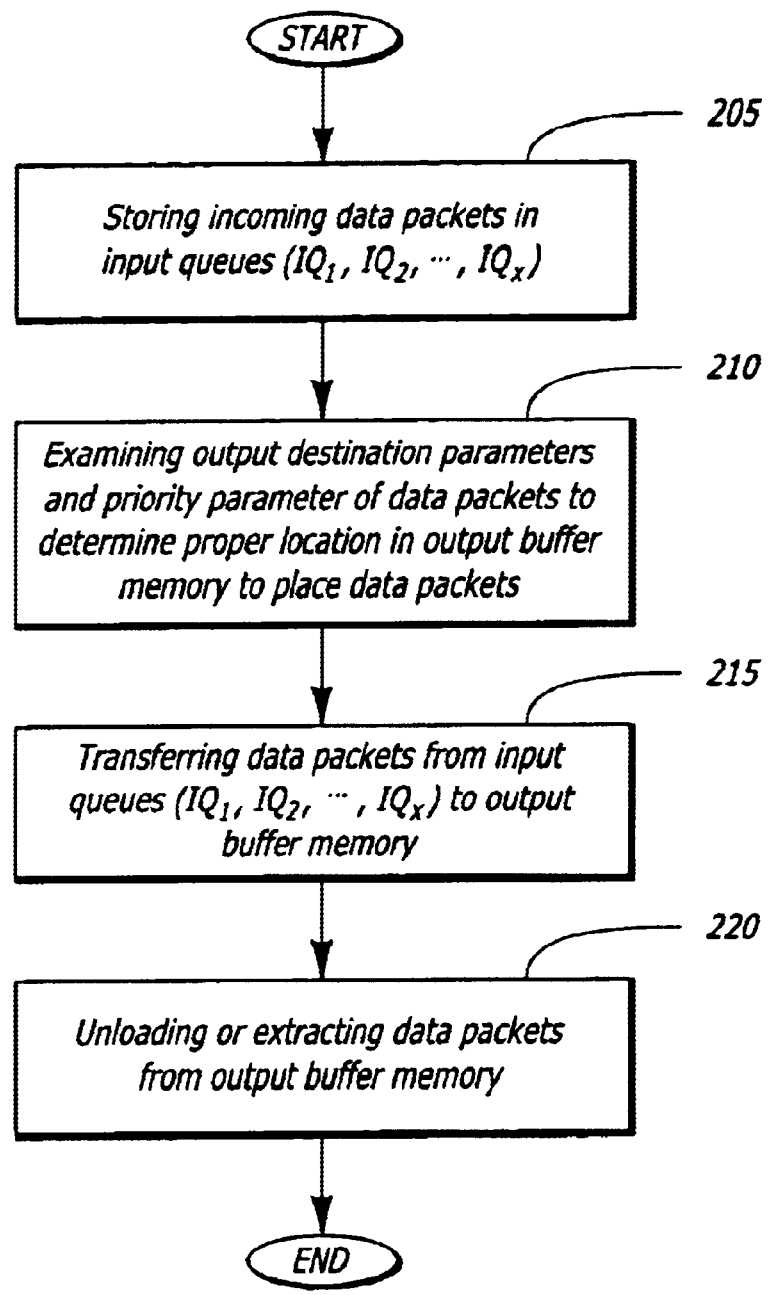
FIG. 2 outlines a method of operation of one embodiment of a packet switch buffer system in accordance with the teachings of the present invention.

FIG. 2 outlines a method of operation of one embodiment of a packet switch buffer system in accordance with the teachings of the present invention. In block 205, incoming data packets are received by the packet switch output buffer system and temporarily written to input queues ($IQ_1$, $IQ_2$, ..., $IQ_x$). As described above, each data packet includes output destination and priority parameters dictating the proper location where the data packet should be transferred. The output destination and priority parameters associated with each data packet are examined in order to determine the appropriate location in the output buffer memory of the packet switch system (block 210).

In block 215, data packets are written to the proper location in the output buffer memory based on the output destination and priority parameters associated with the data packets. For example, high-priority data packets, which are to be unloaded during $TS_1$ and which are destined for $LC_1$, should be placed into the ($LC_1$, $TS_1$, HP) queue section of $OQ_1$ in $OMB_1$, as shown in FIG. 1. Similarly, low-priority data packets, which are to be unloaded at $TS_m$ and which are destined for $LC_n$, should be placed into ($LC_n$, $TS_m$, LP) queue section of $OQ_m$ in $OMB_n$, as shown in FIG. 1. In block 220, data packets stored in the output buffer memory of the packet switch system are unloaded or extracted. As stated above, the data packets are extracted or unloaded from the output buffer memory in accordance with a predetermined cyclical or round-robin service sequence to service output memory blocks.

Figure 3:
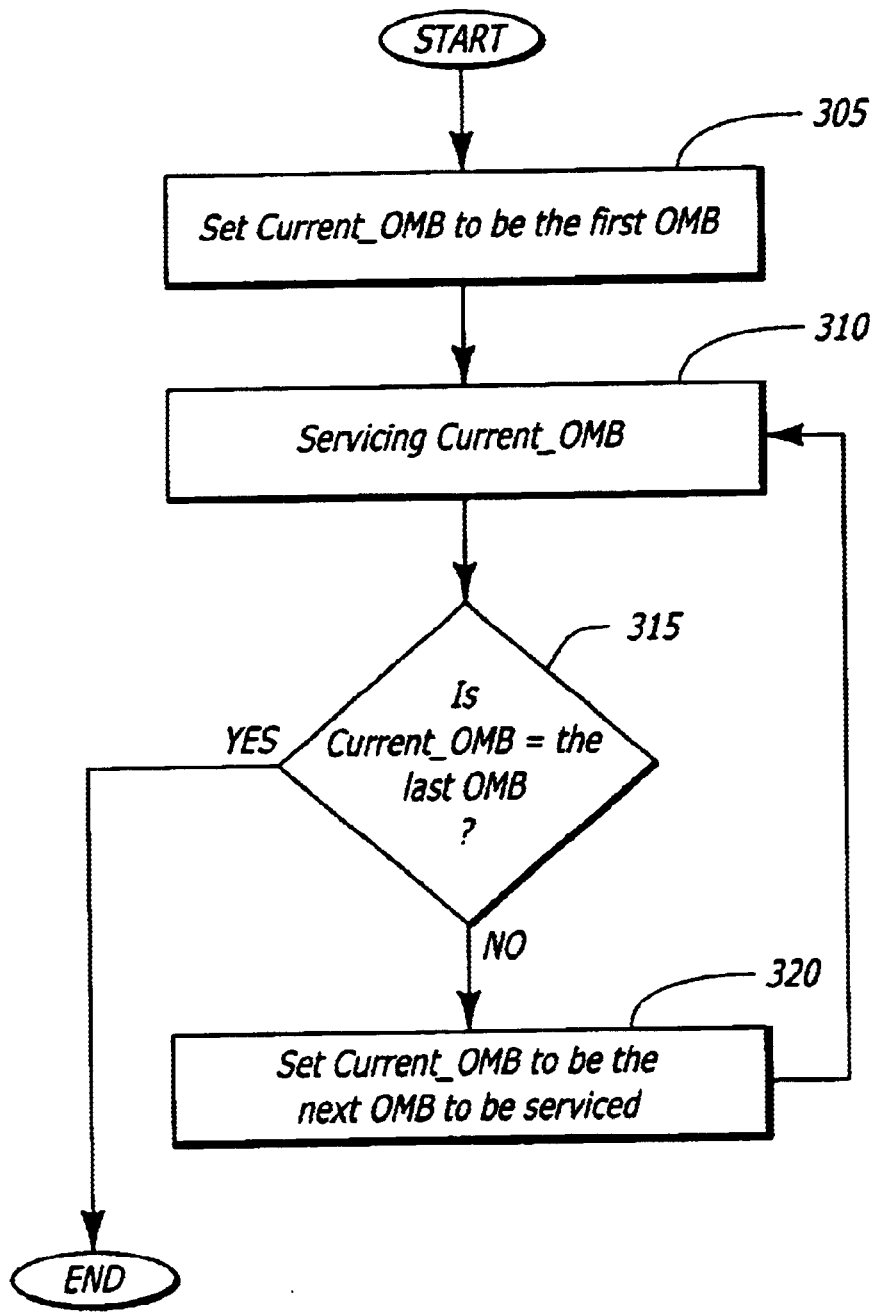
FIG. 3 outlines the process of extracting or unloading data packets from the output buffer memory.

FIG. 3 outlines the process of extracting or unloading data packets from the output buffer memory. As described above, output buffer memory includes a plurality of output memory blocks ($OMB_1$, $OMB_2$, ..., $OMB_n$). In general, data packets from output memory blocks ($OMB_1$, $OMB_2$, ..., $OMB_n$) are extracted or unloaded in accordance with a predetermined cyclical or round robin service sequence. It should be noted that the unloading or extracting of data packets from an output memory block is also referred to as servicing the output memory block. In the round-robin service sequence, output memory blocks ($OMB_1$, $OMB_2$, ..., $OMB_n$) are sequentially serviced in sequential block service periods.

In block 305 of FIG. 3, Current_OMB is set equal to the first output memory block, or $OMB_1$. Current_OMB represents the output memory block being serviced. In block 310, data packets in Current_OMB are extracted or unloaded, as outlined in more details in FIG. 4. After Current_OMB is serviced, a query is performed to determine whether Current_OMB is equal to the last output memory block, or $OMB_n$ (block 315). If Current_OMB equals the last output memory block, or $OMB_n$, the extracting or unloading of data packets from the output buffer memory is completed. If Current_OMB does not equal the last output memory block or $OMB_n$, Current_OMB is set to the next OMB to be serviced. Also, blocks 310, 315, and 320 are repeated.

Figure 4:
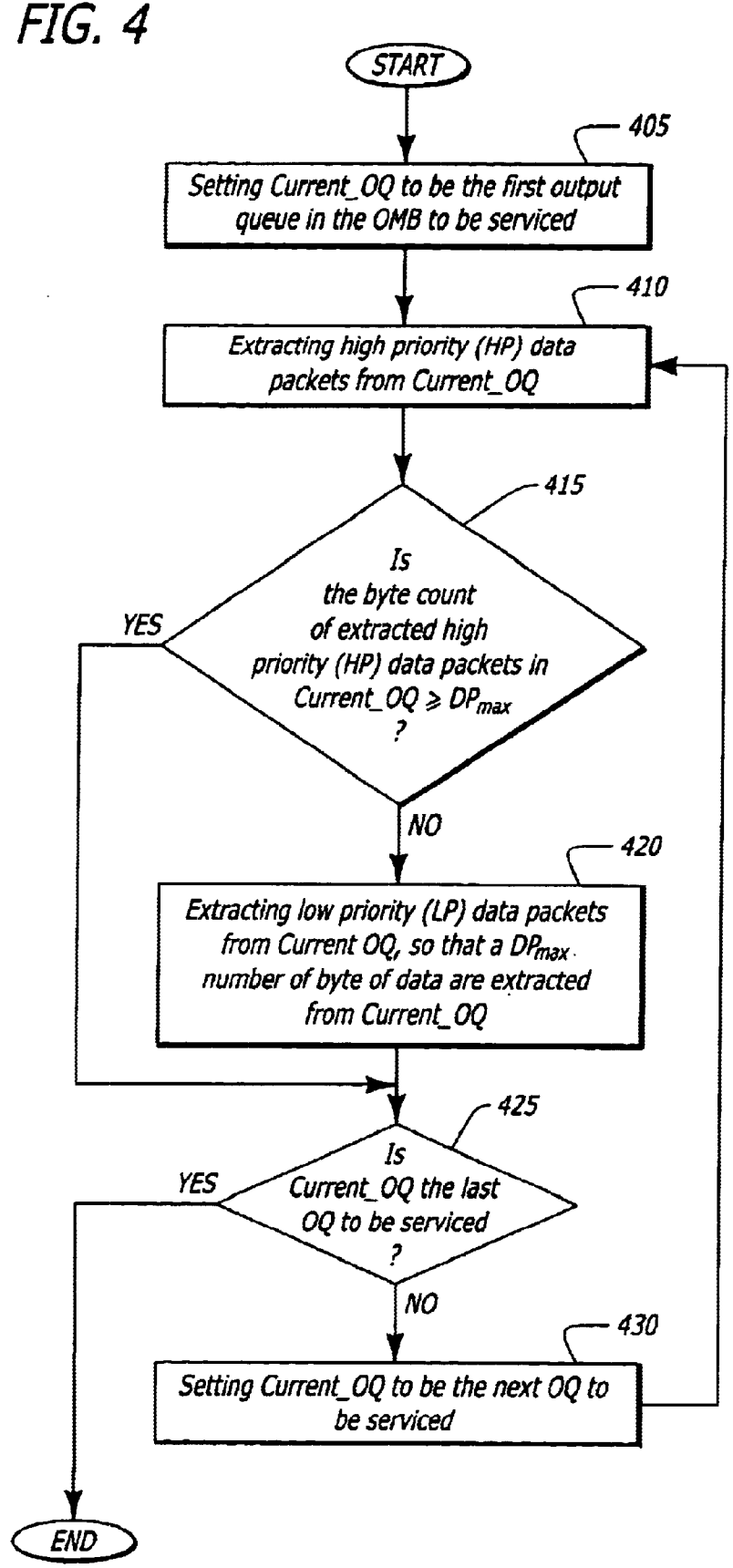
FIG. 4 outlines the process of unloading data packets from an output memory block.

FIG. 4 outlines the process of unloading data packets from an output memory block. In general during each block service period when an output memory block is serviced, output queues ($OQ_1$, $OQ_2$, ..., $OQ_m$) in that output memory block are serviced using a cyclical or round-robin service sequence. In using a cyclical or round-robin service sequence, output queues ($OQ_1$, $OQ_2$, ..., $OQ_m$) are sequentially serviced in sequential queue service periods 1 to m, wherein queue service period 1 precedes queue service period 2 and queue service period m−1 precedes queue service period m. Accordingly, $OQ_1$ is serviced during queue service period 1; $OQ_2$ is serviced during queue service period 2; and $OQ_m$ is serviced during block service period m.

In block 405 of FIG. 4, Current_OQ is set to the first output queue or $OQ_1$. Current_OQ represents the current output queue being serviced. When servicing the Current_OQ, a predetermined amount of bytes of data ($DP_{max}$) are extracted from the Current_OQ. $DP_{max}$ is stored in a data structure referred to as a "permit." In one embodiment, $DP_{max}$ may be set to at least 2056 bytes. It should be noted, however, that $DP_{max}$ is a programmable value that can be set to any values.

In extracting or unloading data packets from the output queue being serviced, data packets from the high-priority (HP) queue section are first extracted or unloaded (block 410). If the byte count of the extracted high-priority data packets is not greater or equal to $DP_{max}$, data packets from the low-priority (LP) section are then extracted or unloaded, so that a total of $DP_{max}$ bytes of data are extracted or unloaded from the Current_OQ (block 420).

After the Current_OQ is serviced, a query is performed to determine whether Current_OQ is equal to the last output queue or $OQ_m$ (block 315). If Current_OQ equals the last output memory queue or $OQ_m$, the servicing of an output memory block is completed. If Current_OQ is not the last output queue ($OQ_m$) in the current output memory block being serviced, Current_OQ is set to the next output queue to be serviced. Also, blocks 410 through 430 are repeated.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A packet switch system, comprising:
 a plurality of input queues in an input buffer memory, each of the input queues configured to store data packets;
 a plurality of output queues in an output buffer memory operatively coupled to the input buffer memory, each of the output queues configured to store those of the data packets destined for a port on a corresponding line card;
 a scheduler coupled to the plurality of output queues to extract data packets stored in the plurality of output queues in a permit-based round-robin service sequence; and
 a predetermined maximum byte count of data for each of the plurality of output queues, each maximum byte count limiting the number of data packets that may be extracted from each of the plurality of output queues during a queue service period.

2. The packet switch system of claim 1, wherein each of the output queues includes a high-priority section to hold high-priority date packets and a low-priority section to hold low-priority data packets.

3. The packet switch system of claim 1, wherein each of the output queues is assigned a time slice for extracting data packets.

4. The packet switch system of claim 2, wherein low-priority data packets are not extracted from the low-priority section if there are high-priority data packets in the high-priority section.

5. The packet switch system of claim 1, further comprising a buffer memory interface coupled between the input buffer memory and the output buffer memory to transfer data packets from the input buffer memory to the output buffer memory.

6. The packet switch system of claim 5, wherein:
 each of the data packets include an output destination parameter and a priority parameter; and
 the buffer memory Interface examines the output destination parameter and the priority parameter to determine where to place the data packets In the output buffer memory.

7. An output buffer system in a packet switch, comprising:
 a plurality of output queues in an output buffer memory, each of the output queues configured to store those of the data packets destined for a port on a corresponding line card;
 a scheduler coupled to the plurality of output queues to extract data packets stored in the plurality of output queues in a permit-based round-robin service sequence; and
 a predetermined maximum byte count of data for each of the plurality of output queues, each maximum byte count limiting the number of data packets that may be extracted from each of the plurality of output queues during a queue service period.

8. The output buffer system of claim 7, wherein each of the output queues includes a high-priority section to hold high-priority data packets and a low-priority section to hold low-priority data packets.

9. The output buffer system of claim 8, wherein low-priority data packets are not extracted from the low-priority section if there are high-priority data packets in the high-priority section.

10. The output buffer system of claim 7, wherein each of the output queues is assigned a time slice for extracting data packets.

11. The output buffer system of claim 7, further comprising a buffer memory interface coupled to the output buffer memory to write data packets to the output buffer memory.

12. The output buffer system of claim 11, wherein:

each of the data packets include an output destination parameter and a priority parameter; and the buffer memory interface examines the output destination parameter and the priority parameter to determine where to write the data packets in the output buffer memory.

13. A method of switching data packets, comprising:

storing incoming data packets in an input buffer memory;

examining an output destination parameter included in the data packets to determine a locations in one of a plurality of output queues in an output buffer memory where the data packets should be transferred;

transferring data packets from the input buffer memory to the determined output queue in the output buffer memory, such that date packets destined for a port on a line card are written in the one of the output queue corresponding to the port on the line card;

employing a permit-based round-robin service sequence to extract data packets from output queues in the output buffer memory; and limiting the number of data packets that may be extracted from each of the output queues during a queue service period with a predetermined maximum byte count of data for each of the output queues.

14. The method of claim 13, further comprising:

examining a priority parameter included in the data packets to determine the locations in the one of the plurality of output queues where the data packets should be transferred.

15. The method of claim 3, further comprising:

transferring data packets from the input buffer memory to the output buffer memory, such that high-priority data packets destined for a port on the line card are written in a high-priority queue section of the output queue corresponding to the port.

16. The method of claim 15, further comprising:

transferring data packets from the input buffer memory to the output buffer memory, such that low-priority data packets destined for a the port on the line card are written in a low-priority queue section of the output queue corresponding to the port.

17. The method of claim 16, wherein low-priority data packets are not extracted from the low-priority section if there are high-priority data packets in the high-priority section.

18. A packet switching system, comprising:

means for storing incoming data packets in an input buffer memory;

means for examining an output destination parameter included in the data packets to determine a locations in one of a plurally of output queues in an output buffer memory where the data packets should be transferred;

means for transferring data packets from the input buffer memory to the determined output queue in the output buffer memory, such that data packets destined for a port on a line card are written in the one of the output queues corresponding to the port on the line card;

means for employing a permit-based round-robin service sequence to extract packets from output queues in the output buffer memory; and means for limiting the number of data rackets that may be extracted from each of the output queues during a queue service period with a predetermined maximum byte count of data for each of the output queues.

19. The system of claim 18, further comprising:

means for examining a priority parameter included in the data packets to determine the locations in the one of the plurality of output queues where the data packets should be transferred.

20. The system of claim 18, further comprising:

means for transferring data packets from the input buffer memory to the output buffer memory, such that high-priority data packets destined for a port on the line card are written in a high-priority queue section of the output queue corresponding to the port.

21. The system of claim 20, further comprising:

means for transferring data packets from the input buffer memory to the output buffer memory, such that low-priority data packets destined for the port on the line card are written in a low-priority queue section of the output queue corresponding to the port.

22. The system of claim 21, wherein low-priority data packets are not extracted from the low-priority section if there are high-priority data packets in the high-priority section.

* * * * *